Sept. 17, 1963      H. H. MERRIMAN      3,104,136
BUSHING

Filed May 19, 1960

INVENTOR
HENRY H. MERRIMAN

BY *Beaman & Beaman*
ATTORNEY

United States Patent Office 3,104,136
Patented Sept. 17, 1963

3,104,136
BUSHING
Henry H. Merriman, 751 W. Washington Ave.,
Jackson, Mich.
Filed May 19, 1960, Ser. No. 30,259
8 Claims. (Cl. 308—237)

The invention relates to an insert adapted to be molded into a molded article and particularly, relates to a bushing insert.

In the manufacture of molded articles of plastic, resins, rubber or synthetic materials, it is often advantageous to mold an insert of a dissimilar material into the article. Usually such an insert is of metal and is affixed to the article for purposes of reinforcement or increasing wear characteristics many inserts having threaded holes in them for attaching screws to the molded article. Such inserts are usually molded into the formed article at the time of the molding of the article itself whereby a very effective connection between the article and insert is produced. However, in that the insert is often subjected to forces tending to either pull the insert from the article or rotate the insert relative to the article or both, means must be provided for establishing a positive connection between the article and insert to prevent such relative movements therebetween.

It is the primary object of the invention to provide an insert adapted to be molded into a molded article wherein the insert, such as a bushing insert, is provided with a configuration which securely locks the insert to the molded article.

Another object of the invention is to provide an insert for use with molded articles wherein means are provided on the insert for effectively resisting forces tending to pull the insert from the article or rotate the insert relatively thereto.

Yet another object of the invention is to provide an insert for use with molded articles wherein means are provided for establishing an effective connection between the insert and article and such means may be very economically formed and produced.

Figure 2:
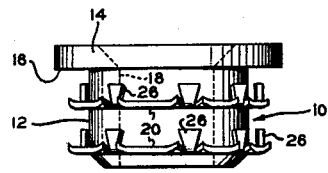
Figure 1:
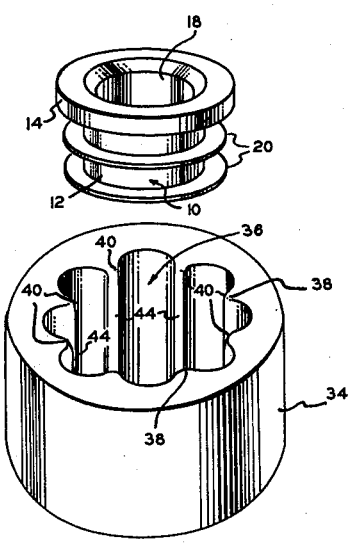
Figure 3:
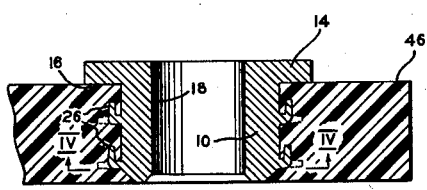
Figure 4:
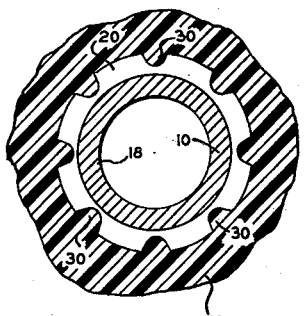
Figure 5:
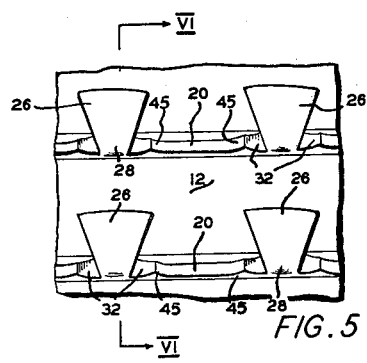
Figure 6:
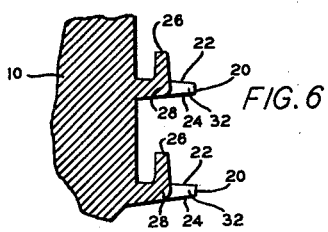

These and other objects of the invention arising from the details and structural relationships of an embodiment thereof will appear from the following description and accompanying drawings wherein:

FIG. 1 is the perspective view of an insert in accord with the invention prior to the forming of the projection upon the ridges and the tool employed for forming the projections, FIG. 2 is an elevational view of a bushing insert in accord with the invention, FIG. 3 is an elevational sectional view of a bushing insert as molded into a plastic article, FIG. 4 is a bottom sectional view taken along section IV—IV of FIG. 3, FIG. 5 is a detail, enlarged elevational view of the ridges and tongue projections employed with the insert of the invention, and FIG. 6 is an elevational sectional view of a detail of the invention taken along section VI—VI of FIG. 5.

While the invention is described in the form of a bushing insert and, in particular, a drill bushing insert, it will be appreciated that the inventive concept thereof may be employed with other types of inserts used with molded articles. The invention is especially advantageous when used with inserts, such as drill bushings, wherein the insert is subjected to longitudinal, rotational and vibrational forces.

A bushing insert in accord with the invention may take the form shown in FIG. 1 wherein the bushing is of generally tubular configuration having a body 10 of cylindrical shape having an outer surface 12. A concentric cylindrical cap 14 is defined integral with the body 10 and is of a larger diameter defining an undersurface 16. A countersunk bore 18 extends axially through the cap 14 and body 10 and serves to guide a drill, not shown, which may be inserted into the bushing. The bushing insert is provided with at least one, two in the illustrated form, annular ridges or ribs 20 which radially project from the body surface 12 and circumscribe the body. Preferably, the ridges 20 are defined in a plane which is perpendicular to the longitudinal axis of the body 10. The ridges 20 are defined by an upper surface 22 and a lower surface 24 and it will be apparent from FIG. 6 that these surfaces are not parallel but rather converge in an outward direction. In the commercial embodiment the surfaces 22 and 24 are inclined approximately 10° to the horizontal, as shown in FIG. 6.

It will be appreciated that the above described bushing insert may be easily produced by high production methods such as automatic screw machine operations and that the manufacturing costs of such a bushing are small.

A plurality of tongue projections 26 are formed upon and from the ridges 20, FIG. 2. The projections 26 are lanced from the peripheral portions of the ridges 20 whereby the projections extend from the plane of the ridges and are connected thereto by a deformed ridge portion 28, FIG. 6. It will be noted that the projections 26 are in spaced parallel relation to the body surface 12. In the lancing and deforming operation which produces the projections 26 a recess 30, FIG. 4, is defined in the peripheral edge of the ridges by the displaced material forming the tongue and the recesses 30 are defined by sides 32, FIG. 5, which are substantially perpendicular to the plane of the ridges.

The tongue projections 26 are formed in the annular ridges 20 by means of the tool 34 shown in FIG. 1. Prior to the forming of the projections the bushing will appear as in FIG. 1 wherein the ridges 20 are as shown. The tool 34 is of tubular configuration having a concentric bore 36 in which a plurality of teeth 38 are defined. The teeth extend in the longitudinal direction of the tool and are parallel to the axis thereof being circumferentially spaced about the periphery of the tool bore. The teeth 38 are slightly countersunk and radiused on the leading edge 40 of the tooth whereby upon axially forcing the bushing insert into the bore 36 of the tool the dimension of the tool bore and teeth in relation to the diametrical dimension of the ridges is such that the countersunk or inclined portion 40 of the teeth will deform upwardly portions of the ridges and tear through the ridges to define the recess sides 32 yet the portion 44 of the teeth defining the longitudinal tooth edge and the portion 40 is relatively dull whereby the ridge portion or tongue 26 removed from the ridge is bent upwardly rather than being severed completely from the ridge. By inserting the bushing insert into the bore of the tool to the point where the under surface 16 of the cap 14 approaches the top edge of the tool 34 both of the ridges 20 will have tongue projections 26 formed therein. Thus, the projections 26 are simultaneously formed at spaced locations on the ridge circumference and upon withdrawing the bushing insert from the tool, the bushing will appear as in FIG. 2 and may now be hardened prior to use in the molded article.

It will be apparent from FIG. 5 that the ridge portions 45 immediately adjacent the sides 32 of the recesses are slightly deformed upwardly from the general plane of the ridges due to the pressure exerted on the ridges by the tool 34 during the formation of the tongue projections. It will also be appreciated that the tongue projections are of a somewhat triangular configuration, the shape of the tongue projections being similar to that of the recess from which the projection is formed. In that the ridges 20 are formed by the outwardly converging surfaces 22 and 24, upon forcing the bushing into the tool 34 the projections will be formed as shown in that the fact that the ridges are of their greatest thickness adjacent the surface 12 the strength of the ridges will be the greatest at that point and the formation of the tongue projections will be determined by the configuration of tool teeth 38 alone and the deformed portion 28 of the tongue projections will occur in the desired location. Were the ridges 20 of a uniform thickness there is the possibility that the location of the deformed portion 28 could not be accurately controlled and the manufacture of the tongue projections would not be as consistent as with the disclosed embodiment.

To mold the insert into the molded article the insert is placed in a die in a conventional manner and the moldable material is injected into the die whereby the material completely encompasses the insert surface 12 and will intimately engage all portions of the surface 12, ridges 20, tongue projections 26, and recesses 30. Upon removing the molded article 46 from the die the insert will be firmly molded therein. It will be appreciated that the insert is securely locked into the molded article so as to resist longitudinal, rotational and vibratory forces interposed thereon. The material surrounding the horizontal portions of the ridges 20, FIG. 2, is effective to prevent a longitudinal displacement of the insert relative to the molded article. In that the tongue projections 26 and the ridge portions 45 extend out of the plane of the ridges, the molded material engaging the tongue projections and ridge projections will effectively resist relative rotational movement between the insert and molded article. Also, in that the molded material will flow into the recesses 30 the sides 32 thereof cooperating with the molded material therein likewise resist torsional forces imposed on the insert. It will, thus, be appreciated that the invention provides an insert structure which will intimately and effectively cooperate with the article associated with the insert to intimatly bond and affix the insert to the article.

It will be understood that the described embodiment is for illustrative purposes only and that other embodiments of the invention may be apparent to those skilled in the art without departing from the spirit and scope thereof.

I claim:
1. An insert to be molded into a moldable material, said insert having a body of elongated configuration having a longitudinal axis, and exterior surface defined on said body encompassed within the moldable material, a planar ridge integrally defined on and circumscribing said body projecting from said surface at right angles to said longitudinal axis, and a plurality of projections formed on said ridge from material adjacent the periphery thereof projecting from the ridge plane and connected thereto by a deformed ridge portion said projections having edges defined thereon transversely disposed to the plane of said ridge and transversely related to the adjacent exterior body surface.

2. In an insert as in claim 1 wherein said projections are in spaced relation to said surface and are disposed substantially parallel thereto.

3. In an insert as in claim 1 wherein a plurality of ridges are defined on said body projecting from said surface, said ridges being axially spaced in parallel relation upon said body.

4. In an insert as in claim 1 wherein the ridge portions adjacent the recesses defined in the ridge by the displaced projections are deflected from the plane of the ridge.

5. In an insert as in claim 4 wherein said projections are lanced from the outer edge portion of said ridge whereby said recess intersects the periphery of said ridge and said ridge is defined by upper and lower outwardly converging surfaces.

6. An insert to be molded into a moldable material comprising, in combination, a body having a longitudinal axis and a cylindrical exterior surface concentric thereto, a ridge integrally formed from the body material projecting outwardly from said surface and circumferentially extending thereabout, a plurality of projections formed from the material of said ridge by lancing and projecting transversely with respect to said ridge, edges defined on said projections having surfaces transversely disposed to the adjacent exterior body surface, a recess defined in said ridge adjacent each projection by the removal of the associated projection material from said ridge, each of the recesses including edges having surface portions transversely related to the adjacent body exterior surface and substantially radial with respect to said body.

7. In an insert as in claim 6, wherein said ridge is deformed adjacent said recess edges in the direction of the associated projection.

8. In an insert as in claim 6, wherein said projections are lanced from said ridge adjacent the ridge periphery whereby said projections include an unattached end remote from said ridge, said unattached projection ends constituting a portion of the ridge periphery prior to lancing of said projections from said ridge.

References Cited in the file of this patent
UNITED STATES PATENTS

| | | |
|---|---|---|
| 987,361 | Hasburg | Mar. 21, 1911 |
| 2,308,952 | Ickes | Jan. 19, 1943 |
| 2,663,895 | Petri | Dec. 29, 1953 |